(No Model.)

C. B. TRUMBLE.
JAW TRAP.

No. 418,772. Patented Jan. 7, 1890.

Witnesses
H. P. Denison
R. A. Weldman

Chauncey B. Trumble Inventor
By his Attorneys
Smith & Denison

N. PETERS, Photo-Lithographer, Washington, D. C.

UNITED STATES PATENT OFFICE.

CHAUNCEY B. TRUMBLE, OF GROTON, NEW YORK.

JAW-TRAP.

SPECIFICATION forming part of Letters Patent No. 418,772, dated January 7, 1890.

Application filed April 29, 1889. Serial No. 309,126. (No model.)

*To all whom it may concern:*

Be it known that I, CHAUNCEY B. TRUMBLE, of Groton, county of Tompkins, in the State of New York, a citizen of the United States, have invented certain new and useful Improvements in Spring-Traps, of which the following is a specification, reference being had to the accompanying drawings, in which—

Figure 1:
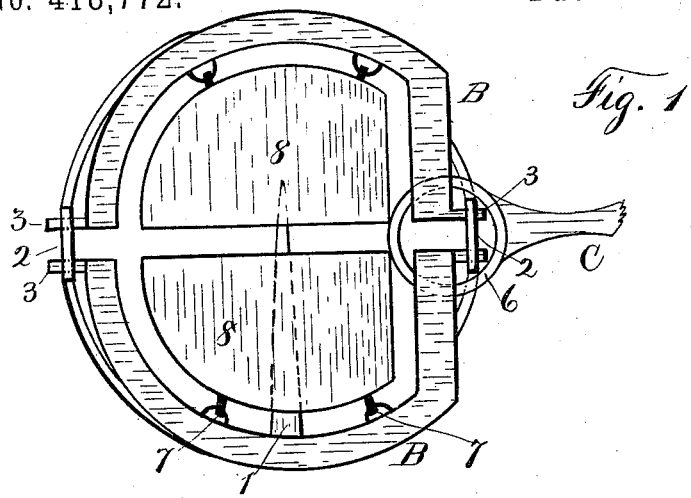
Figure 2:
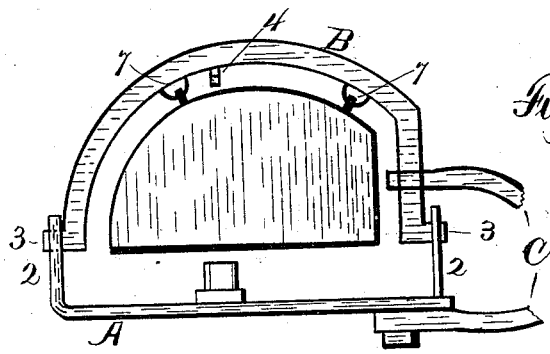
Figure 3:
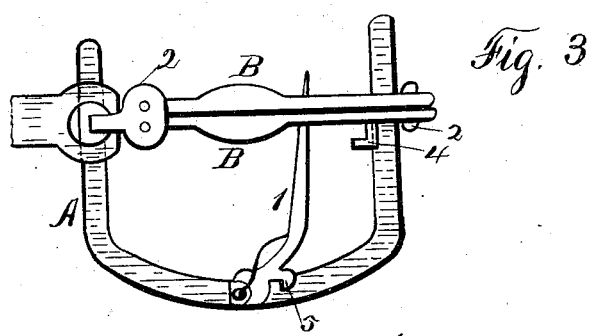

Figure 1 is a top plan view of the trap open and set, the frame there shown being what I call a "full-frame." Fig. 2 is a side elevation of the trap closed or sprung. Fig. 3 is a top plan of the trap sprung, showing also what I term my "half-frame."

My invention relates to the construction of traps for catching animals, and more especially to that class which are provided with means for preventing the animals from gnawing off a foot or leg when caught in the trap and thus releasing itself therefrom.

The object of my invention is to produce a double-jawed trap in which the jaws fold apart and are there caught by a catch upon the main frame, and which are provided with means for preventing the animal from gnawing off his leg or foot, and in which the table or pan is sectional and each section is hinged to a jaw-piece, both sections lying upon the trigger when the trap is opened and set.

My invention consists in the several novel features of construction and operation hereinafter described, and which are specifically set forth in the claims annexed.

It is constructed as follows:

A is the main frame, either rectangular, (with or without rounded corners,) oval, or circular in form, either in full size, as shown in Fig. 1, or of one-half size, or of substantially U form, as shown in Fig. 3. When in the latter form, there is only one side bar of the frame. The trigger 1 is hinged upon the side bar and consists of a bar long enough to extend transversely across the frame beyond the center, and is provided with a hook 5 upon its outer end. Upon the end bars of the frame I erect the posts 2, perforated near their upper ends. The main frame and one or both of these posts can be stamped in one piece from sheet metal, or in more than one, and secured together in any usual manner.

B B are the jaws, arching in form and having their extremities bent outwardly, forming the trunnions 3, which fit freely in the holes in the post 2. One of these jaws is provided with a catch 4 of such construction that when the jaws are spread apart and the trigger raised it will engage with the hook or projection 5 on the trigger and form the lock, holding the jaws open.

C is the spring-handle, of ordinary construction, provided with the eye 6, fitting around the posts 2 on that end of the strap, the other arm of the spring being secured to the frame in any ordinary manner.

At 7 I show hinges connecting the swinging pan-sections 8 to the jaws B, which pan-sections are suspended from the jaws when the trap is closed, as shown in Fig. 2; and when the trap is open they lie upon the trigger 1, as shown at 5, the catch 4 engaging with the hook 5 of the figure, so that when weights are applied to either pan-section the hook 5 and catch 4 become released from each other, and when released spring C will throw the jaws together, and the foot or leg of the animal caught between the jaws will be covered as to that part within the jaws by the pan-sections being between them, so that the animal cannot reach it with his teeth to gnaw off and release himself.

This trap is designed to be used without bait and operated by vertical downward pressure upon either pan-section, which depresses the free end of the trigger until the catch is free, and then the mainspring will throw the jaws together with the pan-section pendent vertically and the trigger will lie horizontally sustained by the spring when a spring is used.

What I claim is—

1. The combination, with the jaws of a trap, of a sectional pan, the sections of which are hinged to the jaw-pieces, substantially as described.

2. The combination, with the jaws and the pan-sections hinged thereto, of a trigger engaging with one of the jaws and supporting the pan-sections, and a spring for operating the jaws and a main frame in which the jaws are pivoted and to which the trigger and spring are connected, substantially as described.

In witness whereof I have hereunto set my hand this 28th day of January, 1889.

CHAUNCEY B. TRUMBLE.

In presence of—
 HOWARD P. DENISON,
 C. W. SMITH.